UNITED STATES PATENT OFFICE.

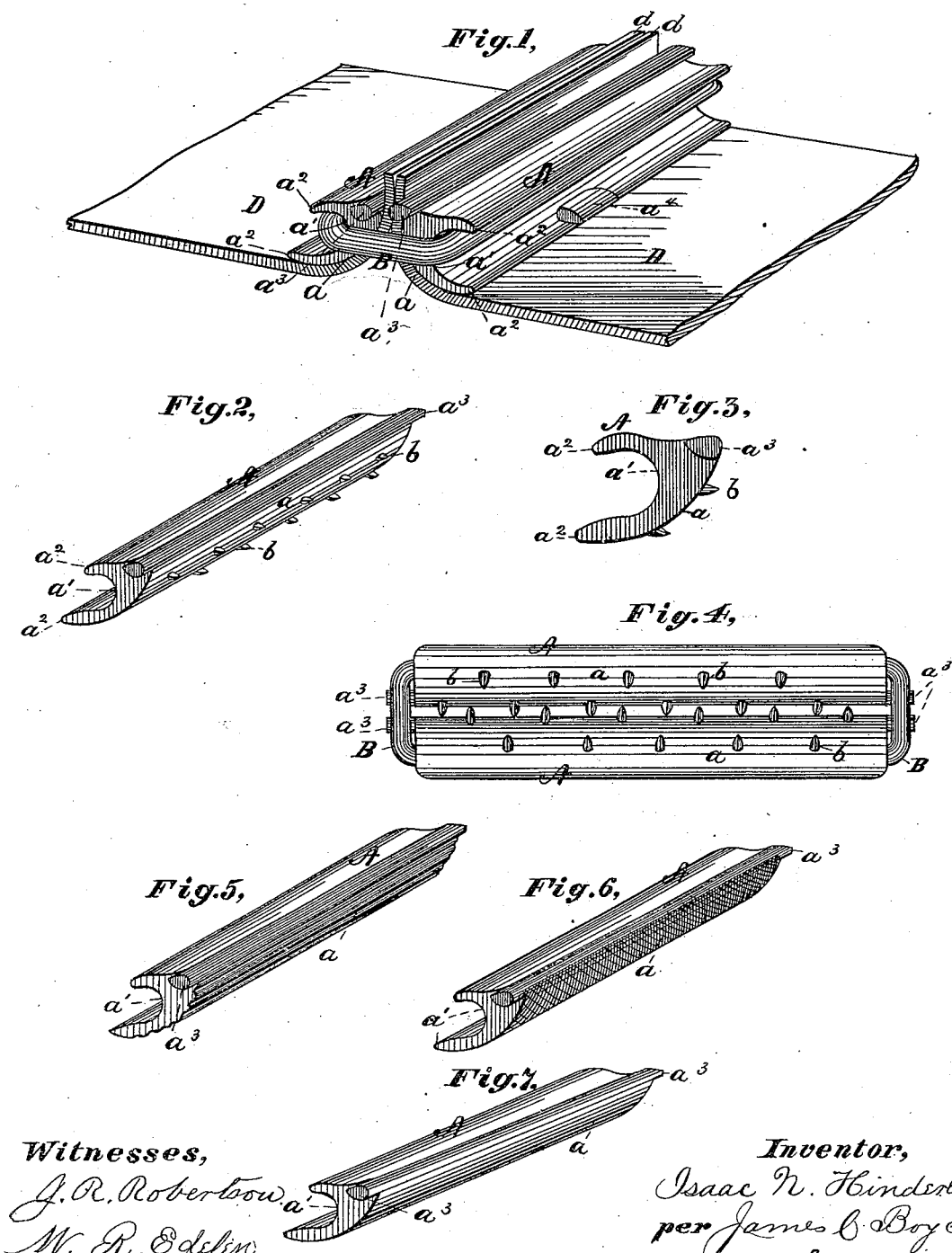

ISAAC N. HINDERLITER, OF CRANBERRY TOWNSHIP, VENANGO COUNTY, PENNSYLVANIA.

BELT-COUPLING.

SPECIFICATION forming part of Letters Patent No. 234,776, dated November 23, 1880.

Application filed March 24, 1879.

*To all whom it may concern:*

Be it known that I, ISAAC N. HINDERLITER, of Cranberry township, in the county of Venango and State of Pennsylvania, have invented certain new and useful Improvements in Belt-Couplings; and I do hereby declare that the following is a full, clear, and exact description of the invention, which will enable others skilled in the art to which it appertains to make and use the same, reference being had to the accompanying drawings, and to letters of reference marked thereon, which form a part of this specification, in which—

Figure 1 is a perspective view of my belt-coupling securing the ends of a belt. Fig. 2 is a perspective view of one of the coupling-clamps, showing the barbs. Fig. 3 is an end view of one of the coupling-clamps. Fig. 4 is a bottom view of the coupling. Fig. 5 is a perspective view of a coupling-clamp with a corrugated, fluted, or waved face. Fig. 6 is a perspective view having the face scored or serrated. Fig. 7 is a perspective view with a plain face.

Heretofore belt-couplings have been made with rollers having a portion of their surface grooved and eccentric to their journals, and said journals have been retained at uniform distance apart by passing through end frames in which they can freely rotate. They require boring, fitting, and riveting of the parts. Other couplers have been made with two stationary clamping-faces cast in one piece and provided with an independent central wedge, serrated or provided with pins to retain the ends of a belt between said wedge and clamping-faces, and such couplers are not of my invention.

My invention consists of an improved coupling provided with homogeneous clamps secured by a link. The coupling is held in position by the tension of the belt, assisted by the barbed, corrugated, or scored faces of the clamps and the surrounding link.

My belt-coupling is composed of two homogenous eccentric clamps, A A, having convex faces $a\ a$, provided with barbs $b$, which impinge on the opposite sides of belting D, with the free ends $d\ d$ projecting above the clamps. The clamps are held securely in position by means of a continuous link, B, which surrounds said clamps and is supported in grooves $a'\ a'$, the extremes of said grooves forming lips $a^2\ a^2$ on the outside and constituting part of said clamps. The clamps are also provided with lugs $a^3\ a^3$ on their opposite ends, to prevent the same from being forced down too far by any unusual pressure that may come upon them, in which case said lugs would be forced against link B, preventing further movement of said clamps, thus devolving the whole strain on said link. The lugs are also designed to prevent the clamps from falling through said link when adjusting the belt. The clamps are further provided with stops $a^4$, forming part of the lower lips, $a^2$, thus preventing the link from becoming detached from the clamps when adjusting the belt in said clamps. As the belt is drawn between the clamps from the under side they are parted and also raised upward by the pressure of the belt on the convex faces until the stops come in contact with said link, which prevents further upward movement.

The faces of the coupling-clamps being eccentric with the grooves in the back of said clamps, it follows that the link pressing against said grooves through the directly-opposite strains of the belt the top of the eccentric faces act like two wedges and secure the belt by its tension.

In operating my improved automatic belt-coupling I ascertain the exact size of the belt. I pass the ends through the clamps from the under side, the ends projecting above the same. After placing the belt on the pulleys and finding it sufficiently tight to prevent slipping I cut the remaining long end of the belt off above the clamps, leaving the short ends project, as shown at $d\ d$, Fig. 1.

In the old method of lacing or using belt-hooks the greatest care must be exercised to have the belt the exact length. If a trifle too long or too short the same slow process of lacing has to be gone over.

With my improved coupling the belt is secured instantly, thus saving time. My improved coupling does not cut the belt as the old style of lacing, and it has an equal pressure across the belting. It can be placed on an old belt which is too rotten to be laced.

My improved belt-coupling is peculiarly adapted for the oil regions, where a tight rubber belt is required to prevent the band-wheel from slipping within said belt, as the tools used in drilling are so heavy on the upward stroke of the walking-beam. The downward stroke is directly opposite, thus producing an alternately spasmodic movement, which has to be held in check by the belting through the medium of the band-wheel. My improved coupling is especially adapted for this kind of belting where a continuous strain is required to prevent pulleys from slipping.

What I claim as new, and desire to secure by Letters Patent, is—

1. A belt-coupling composed of two eccentric clamps supported or secured by and in combination with a link surrounding them, substantially as set forth.

2. A belt-coupling composed of two clamps having convex faces $a\,a$, eccentric with grooves $a'\,a'$, and adapted to clutch and secure the free ends of belting, and a link placed in said grooves, substantially as set forth.

3. A belt-coupling clamp, A, provided with lugs $a^3$ and stops $a^4$, in combination with link B, substantially as set forth.

ISAAC N. HINDERLITER.

Witnesses:
J. R. ROBERTSON,
W. R. EDELEN.